US012587840B2

(12) United States Patent
Kreishan et al.

(10) Patent No.: US 12,587,840 B2
(45) Date of Patent: Mar. 24, 2026

(54) AUTHENTICATION MANAGEMENT IN A WIRELESS NETWORK ENVIRONMENT

(71) Applicant: Charter Communications Operating, LLC, St. Louis, MO (US)

(72) Inventors: Loay O. Kreishan, Aurora, CO (US); Ahmed Bencheikh, Lorton, VA (US)

(73) Assignee: Charter Communications Operating, LLC, St. Louis, MO (US)

( * ) Notice: Subject to any disclaimer, the term of this patent is extended or adjusted under 35 U.S.C. 154(b) by 543 days.

(21) Appl. No.: 17/668,657

(22) Filed: Feb. 10, 2022

(65) Prior Publication Data

US 2022/0322083 A1 Oct. 6, 2022

Related U.S. Application Data

(60) Provisional application No. 63/170,277, filed on Apr. 2, 2021.

(51) Int. Cl.
| | |
|---|---|
| *H04W 12/04* | (2021.01) |
| *H04L 9/40* | (2022.01) |
| *H04W 12/03* | (2021.01) |
| *H04W 12/0431* | (2021.01) |
| *H04W 12/06* | (2021.01) |
| *H04W 12/72* | (2021.01) |

(52) U.S. Cl.
CPC ..... *H04W 12/0431* (2021.01); *H04L 63/0861* (2013.01); *H04W 12/03* (2021.01); *H04W 12/068* (2021.01); *H04W 12/72* (2021.01)

(58) Field of Classification Search
CPC ............. H04W 12/0431; H04W 12/03; H04W 12/068; H04W 12/72; H04L 63/0861
See application file for complete search history.

(56) References Cited

U.S. PATENT DOCUMENTS

| | | | | |
|---|---|---|---|---|
| 8,972,742 | B2 * | 3/2015 | Troncoso Pastoriza | ..................... H04L 63/0861 713/186 |
| 9,202,035 | B1 * | 12/2015 | Manusov | ................. G06F 21/32 |
| 9,445,440 | B2 * | 9/2016 | Huang | .................. H04W 76/10 |

(Continued)

*Primary Examiner* — Khalid M Almaghayreh

(74) *Attorney, Agent, or Firm* — Armis IP Law, LLC

(57) ABSTRACT

During registration, a mobile communication device derives a first instance of biometric information from a user operating the mobile communication device. The communication device retrieves an encryption key assigned to the mobile communication device. Via application of the encryption key to the first instance of biometric information, the communication device produces first encrypted biometric information and forwards it to an authentication resource. The authentication resource stores the first encrypted biometric information for later authentication of the communication device. During subsequent authentication, the mobile communication device derives a second instance of biometric information from the user operating the mobile communication device. The communication device encrypts the second instance of biometric information with the encryption key and forwards it to the authentication resource. The authentication resource requires a substantial match of the second encrypted biometric information to the first encrypted biometric information to authenticate the communication device to use a wireless network.

22 Claims, 11 Drawing Sheets

(56) References Cited

U.S. PATENT DOCUMENTS

| | | | | |
|---|---|---|---|---|
| 11,947,654 B2* | 4/2024 | Scully-Power | ..... | H04L 63/0861 |
| 2007/0226516 A1* | 9/2007 | Kubota | ................. | H04L 9/3231 |
| | | | | 713/186 |
| 2009/0227274 A1* | 9/2009 | Adler | ...................... | H04W 8/18 |
| | | | | 455/70 |
| 2010/0117791 A1* | 5/2010 | Inoue | ...................... | G06F 21/32 |
| | | | | 340/5.52 |
| 2013/0055289 A1* | 2/2013 | Maltese | .................. | H04L 67/02 |
| | | | | 719/320 |
| 2013/0095794 A1* | 4/2013 | Lhamon | ............. | H04W 12/069 |
| | | | | 455/411 |
| 2013/0333016 A1* | 12/2013 | Coughlin | ............. | H04L 63/083 |
| | | | | 709/227 |
| 2014/0016833 A1* | 1/2014 | Ide | ......................... | G06V 40/10 |
| | | | | 382/115 |
| 2014/0090042 A1* | 3/2014 | Short, III | ............... | H04L 63/08 |
| | | | | 726/5 |

| | | | | |
|---|---|---|---|---|
| 2015/0237045 A1* | 8/2015 | Blessing | ............. | H04W 12/065 |
| | | | | 705/311 |
| 2015/0301784 A1* | 10/2015 | Maruhashi | ............... | G09G 5/12 |
| | | | | 345/2.3 |
| 2016/0094726 A1* | 3/2016 | Abe | ...................... | H04W 48/16 |
| | | | | 358/1.15 |
| 2016/0241553 A1* | 8/2016 | Kim | ...................... | H04W 12/33 |
| 2017/0034703 A1* | 2/2017 | Dimatteo, III | ........ | H04W 12/04 |
| 2017/0193314 A1* | 7/2017 | Kim | ......................... | G06F 3/147 |
| 2018/0019996 A1* | 1/2018 | Morita | ............... | H04L 63/0492 |
| 2018/0109947 A1* | 4/2018 | Kim | ................... | H04W 12/041 |
| 2018/0239885 A1* | 8/2018 | Kumar | ............. | G06V 40/1306 |
| 2019/0013946 A1* | 1/2019 | Maghrebi | ............. | H04L 9/3231 |
| 2021/0211290 A1* | 7/2021 | Jindal | ..................... | H04L 9/008 |
| 2021/0211291 A1* | 7/2021 | Jindal | ..................... | G06N 3/04 |
| 2022/0210642 A1* | 6/2022 | Slovetskiy | ......... | H04W 12/068 |
| 2024/0134948 A1* | 4/2024 | Smith | ............. | G06Q 20/40145 |

* cited by examiner

310   BIOMETRIC IMAGE FILE

320   COMPUTER GRAYSCALE PIXEL IMAGE

330   CODE VECTORS CREATED USING FILTER BANK-BASED ALGORITHM

340   HOMOMORPHIC-ENCRYPT CODE VECTORS USING SECRET KEY

350   PROVISION DEVICE ID, ENCRYPTED FINGER CODE VECTORS WITH CARRIER

AUTHENTICATION MANAGEMENT IN A WIRELESS NETWORK ENVIRONMENT

RELATED APPLICATION

This application claims the benefit of earlier filed U.S. Provisional Patent Application Ser. No. 63/170,277 entitled "AUTHENTICATION MANAGEMENT IN A WIRELESS NETWORK ENVIRONMENT," filed on Apr. 2, 2021, the entire teachings of which are incorporated herein by this reference.

BACKGROUND

In conventional wireless networks, operators and service provider provision subscribers' wireless devices with Network parameters in the form of Network access identifier (NAI) or Mobile identity International Mobile Subscriber Identity (IMSI) in the case of 4G and Subscription Permanent Identifier (SUPI) in the case of 5G. These parameters are provisioned on the device in the form of a code file known as a profile or provided on hardware or integrated circuit known as Subscriber Identification Module (SIM).

Prior to activating the device on the network, the operator or service provider needs to make sure that the profile is installed on the device and that the device is able to process and operate per the parameters in the profile. This process is called activating a profile.

In the case of hardware such as SIM cards, there are multiple challenges such as complex provisioning methods, procurement of SIM cards, distribution and identity management. These challenges present significant cost and operational complexity to the operator. In the case of an MVNO (Mobile Virtual Network Operator), it makes it difficult to switch from one MNO (Mobile Network Operator) to another because it would require swapping of a first physical SIM card with a second physical SIM card.

In the case of the subscriber, the card is locked to one carrier and the subscriber will have to swap cards if they require the service of other carriers. This is in addition to the burdensome process of replacing the card when it malfunctions. To address this issue of having to swap SIM cards, conventional techniques include so-called embedded SIM (eSIM), which is simply an embedded SIM on the device. The eSIM allows the provider the ability to provision profiles remotely on the subscribers' devices.

Remote profile provisioning provided a solution to some provisioning challenges and allowed the user to install multiple providers' profiles on a single SIM. However, there are still challenges in provisioning and managing credentials.

Brief Description of Embodiments

Embodiments herein include use of biometric information to create a unique subscriber account and device ID (Identifier). For example, in one embodiment, single ID information identifies the device and the corresponding user. The ID information is used to authenticate a subscriber on multiple applications such as to provide access to wireless mobile networks.

Utilizing the security characteristics of Integrated SIM (iSIM) technology builds on the eSIM/eUICC remote provisioning functionality, and the security characteristics of being system-on-chip (SoC) embedded directly into the CPU, GPU, LTE or wireless modem.

Main Security Characteristics:

Integrated SIM (iSIM) technology provides strong identification and authentication of devices to the network and can act as the trust anchor for secure communications. It can also be considered as a Hardware Secure Module (HSM) with Root of Trust.

iSIM, as Hardware Security Module (HSM), is a physical computing device that safeguards and manages digital keys, performs encryption and decryption functions for digital signatures, strong authentication and other cryptographic functions.

In one embodiment, during the process of registering for wireless services and creating an account, the user will provide a device ID which could be IMEI (International Mobile Equipment Identity) or EID (i.e., electronic identity) to identify the device and to be compliant with eSIM/iSIM remote provisioning process. In the case of Wi-Fi™, this can be a username like the user's email. During the creation of the account the user additionally submits his/her encrypted credentials in the form biometric ID (BOPS III). The service provider will store user information and encrypted credentials information in database for future authentication requests.

To create the biometric identity, the user scans his/her fingerprint, and based on the Biometric Open Protocol Standard, code vectors are created, encrypted and stored on the iSIM for future authentication requirements. iSIM is considered an excellent medium for storing Private Biometric information described in the Biometric Open Protocol Standard, IEEE 2410 which includes the Private biometrics where biometric information is also encrypted. The carrier will create a record in the database for the user and store these variables in the user's record for future authentication.

During the first time onboarding, user opens his/her mobile device and selects a network from available networks. At this point the device does not contain any information about the subscriber's service or network information and credentials. The subscriber selects a network from a list. Then the device associates to the network and starts the authentication (evaluation) process. The network will request from the connection manager on the device to present the type of authentication and provide credentials. In this case it is the biometric ID.

According to network standards, the authentication will contain the credentials in this case they are the device ID or username, encrypted code vectors and the evaluation key.

Embodiments herein include two stages such as i) first embodiments such as Service Subscription supporting Services selection and account creation, and ii) second embodiments such as Network Association: supporting network registration and authentication.

First Embodiments

More specifically, in accordance with further embodiments herein, a communication device includes communication management hardware. The communication management hardware receives a first instance of biometric information derived from a user operating a mobile communication device. The communication management hardware retrieves an encryption key assigned to the mobile communication device. Via application of the encryption key to the first instance of biometric information, the communication management hardware produces first encrypted biometric information.

In accordance with further example embodiments, the first encrypted biometric information includes encrypted code vectors derived from an image (such as fingerprint, face, etc.) of the user.

The communication management hardware communicates the first encrypted biometric information and an identity of the mobile communication device over a wireless network to an authentication resource that authenticates subsequent use of the wireless network by the mobile communication device.

In response to communicating the first encrypted biometric information to the authentication resource, and registration of the communication device, the communication management hardware of the communication device receives a wireless configuration information profile. The communication management hardware then installs the wireless configuration information profile onto the communication device. In one embodiment, the wireless configuration information profile is used by the communication management hardware to manage subsequent connectivity of the mobile communication device with the wireless network via a second instance of biometric information derived from the user operating the mobile communication device.

In one embodiment, during registration, the communication management hardware of the communication device communicates the first encrypted biometric information and an evaluation key over a wireless communication link to a remote authentication resource for subsequent authentication of the mobile communication device (by the remote authentication resource) such that the mobile communication device is able to use a wireless network to which the encryption key pertains.

In further example embodiments, the communication management hardware retrieves the encryption key applied to the biometric information from a SIM (Subscriber Identity Module) installed on the mobile communication device.

In still further example embodiments, the communication management hardware of the mobile communication device receives or produces a second instance of biometric information derived from the user operating the mobile communication device. The communication management hardware retrieves the encryption key assigned to the mobile communication device. Via application of the encryption key to the second instance of biometric information, the communication management hardware produces second encrypted biometric information. During authentication, the communication management hardware communicates the second encrypted biometric information from the mobile communication device over a wireless network to an authentication server.

As previously discussed, in one embodiment, the biometric information is derived from processing an image of a body part (such as fingerprint, eye, etc.) of the user operating the mobile communication device.

In accordance with another example embodiment, the communication management hardware establishes wireless connectivity between the mobile communication device and a wireless network in response to receiving input from the user operating the mobile communication device to access the wireless network. In such an instance, the communication management hardware receives a request for authentication information. The communication management hardware then prompts the user of the mobile communication device to provide a biometric image to access the wireless network. As previously discussed, and as further discussed below in the second embodiments, the communication management resource produces encrypted biometric information and communicates it to an authentication resource during authentication.

Second Embodiments

Further embodiments herein include a system in which to authenticate one or more communication devices for access to a respective network. For example, an authentication system receives first encrypted biometric information from a first mobile communication device. The first encrypted biometric information is generated via application of an encryption key of the mobile communication device to a first instance of biometric data derived from an image (such as an image of a body part) of the user operating the mobile communication device. The authentication system stores the first encrypted biometric information. The authentication system then utilizes the first encrypted biometric information to authenticate the mobile communication device for use of a wireless network.

For example, in one embodiment, the authentication system receives an evaluation key associated with the communication device and the first encrypted biometric information. The authentication system stores the evaluation key for subsequent authentication of the mobile communication device.

In further example embodiments, in response to receiving a communication from the mobile communication device requesting use of the wireless network, the authentication system communicates a request for authentication information to the mobile communication device. In response to communicating the request, the authenticate system receives second encrypted biometric information from the mobile communication device.

In one embodiment, the second encrypted biometric information is generated via application of the encryption key of the mobile communication device to a second instance of biometric data derived from an image of the user operating the mobile communication device.

Both the first encrypted biometric information and the second encrypted biometric information include encrypted code vectors derived from the image of the user.

In further example embodiments, the encryption key associated with the communication device is stored in a SIM (Subscriber Identity Module) information stored on the mobile communication device.

In yet further example embodiments, the image used to derive the first biometric data is a first image. The authentication resource receives the second encrypted biometric information from the mobile communication device. The second encrypted biometric information is generated via application of the encryption key of the mobile communication device to the second instance of biometric data derived from a second image of the user operating the mobile communication device.

To authenticate the mobile communication device, the authentication resource performs a comparison of the first encrypted biometric information and the second encrypted biometric information. Based on the comparison, the authentication resource produces comparison evaluation information. In one embodiment, the authentication resource applies an evaluation key to the comparison evaluation information to retrieve evaluation results of comparing the first encrypted biometric information and the second encrypted biometric information. As further discussed herein, one embodiment includes implementing so-called homomorphic encryption, which allows computation on encrypted data (such as vectors). For example, such a form of encryption allows computations to be carried out on cipher text, allows the match to be conducted on an encrypted dataset without decrypting the reference biometric, and returns an encrypted match result. Based on the evaluation results, the authentication resource produces a notification indicating a decision to grant (or not to grant) the mobile communication device use of the wireless network. The authentication resource or other suitable entity communicates the notification to the mobile communication device.

Note that any of the resources as discussed herein can include one or more computerized devices, user equipment, wireless communication devices, gateway resources, mobile communication devices, sensors, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and/or operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to support wireless communications using multiple SIM devices and corresponding subscriber identity information according to embodiments herein. The instructions, when executed by the computer processor hardware, cause the computer processor hardware (such as one or more co-located or disparately processor devices or hardware) to: derive a first instance of biometric information from a user operating a mobile communication device; retrieve an encryption key assigned to the mobile communication device; and via application of the encryption key to the first instance of biometric information, produce first encrypted biometric information.

Another embodiment includes a computer readable storage medium and/or system having instructions stored thereon to support wireless communications using multiple SIM devices and corresponding subscriber identity information according to embodiments herein. The instructions, when executed by the computer processor hardware, cause the computer processor hardware (such as one or more co-located or disparately processor devices or hardware) to: receive first encrypted biometric information, the first encrypted biometric information generated via application of an encryption key of the mobile communication device to a first instance of biometric data derived from an image of a user operating the mobile communication device; store the first encrypted biometric information; and utilize the first encrypted biometric information to authenticate the mobile communication device for use of a wireless network.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of authenticating communication devices in a wireless network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
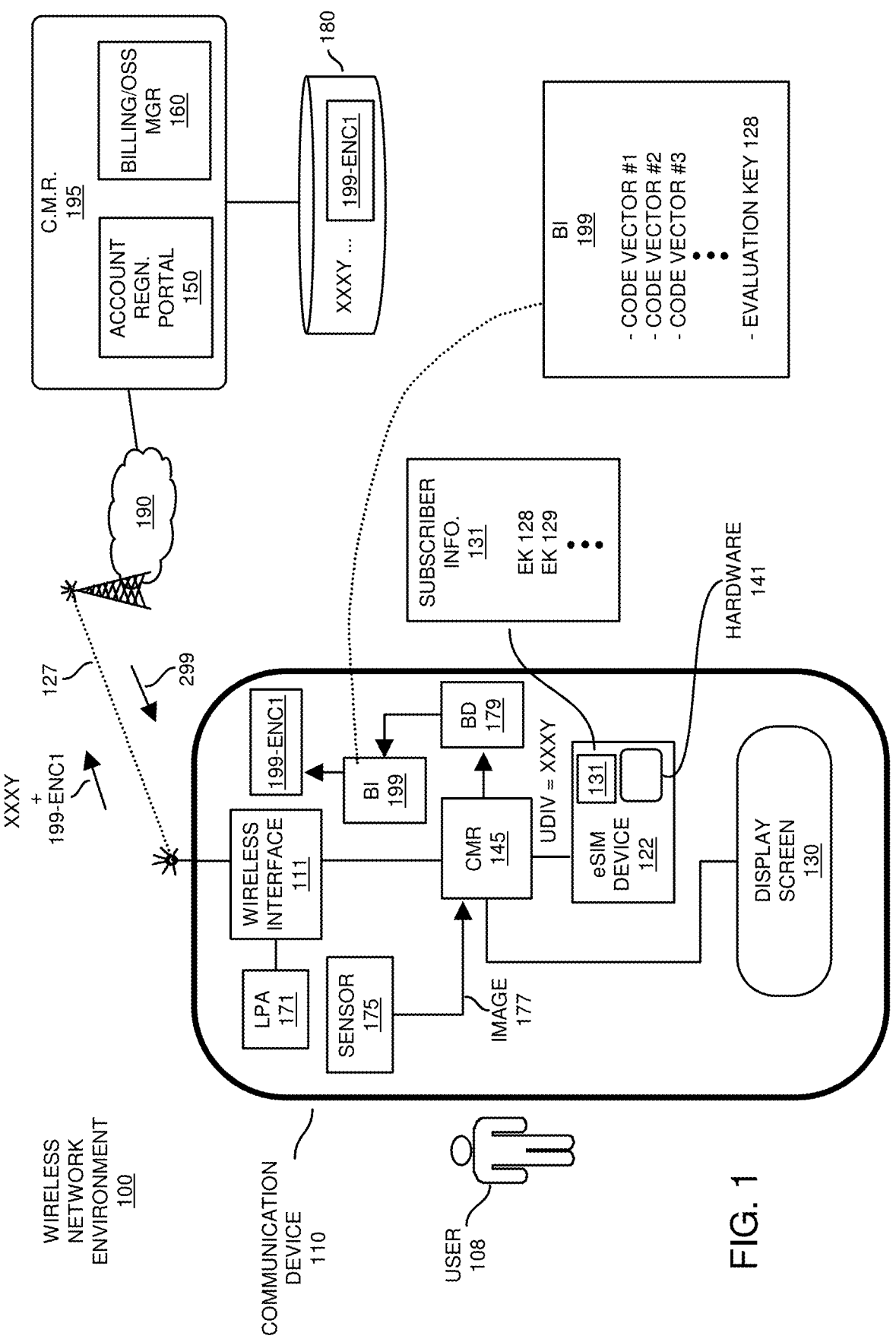
FIG. 1 is an example diagram illustrating registration of user equipment (communication device) supporting a SIM according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

In accordance with embodiments herein, during registration, a mobile communication device derives a first instance of biometric information from a user operating the mobile communication device. The communication device retrieves an encryption key assigned to the mobile communication device. Via application of the encryption key to the first instance of biometric information, the communication device produces first encrypted biometric information and forwards it to an authentication resource (system). The authentication resource stores the first encrypted biometric information for later authentication of the communication device to use a wireless network.

During subsequent authentication, the mobile communication device derives a second instance of biometric information from the user operating the mobile communication device. The communication device encrypts the second instance of biometric information with the encryption key and forwards it to the authentication resource. The authentication resource requires a substantial match of the second encrypted biometric information to the first encrypted biometric information to authenticate the communication device to use a wireless network. In one embodiment, as further discussed herein, an authentication server is provisioned an evaluation key, allowing the server to perform evaluations and make authentication decisions regarding encrypted user biometric information and access without the need for decryption of encrypted personal biometric data.

Now, more specifically, FIG. 1 is an example diagram illustrating registration of user equipment (communication device) with a corresponding network according to embodiments herein.

As shown in this example embodiment, the wireless network environment 100 includes communication device 110 (a.k.a., user equipment, UE, mobile communication device, etc.) operated by user 108, network 190, and communication management resource 195.

Communication device 110 includes wireless interface 111 (supporting one or more wireless communication protocols), sensor 175 (to obtain biometric data/images from the user 108), communication management resource 145 (to manage communications of the communication device), local profile assistant 171 (to manage installation of subscriber information 131 (SIM information) on the communication device 110, eSIM device 122 (or SIM card) to store the subscriber information 131, and display screen 130 to display images.

Note that wireless network environment 100 includes any number of mobile communication devices provided access to the network 190. Note also that the communication device 110 can be any suitable type of device such as a wireless station, mobile communication device, stationary device, etc.

In one embodiment, the eSIM device 122 of communication device 108 includes programmable hardware 141 to execute one or more applications supporting wireless connectivity. The eSIM device 122 (or alternative embodiment a SIM card) also includes hardware storage to store subscriber information 131 (such as eSIM information providing the user access to a respective wireless network).

The subscriber information 131 stores any suitable information. For example, in one embodiment, the subscriber information 131 stores/includes information such as user contact information, telephone numbers, SMS messages, billing information, service plan information, name of service provider, encryption keys, etc.

In one embodiment, as its name suggests, the local profile assistant 171 assists download or installation of subscriber information 131 to the eSIM device 122 on communication device 110.

Note that each of the different components such as communication management resource 145, local profile assistant 171, communication management resource 195, etc., associated with wireless network environment 100 can be implemented via hardware, software, or a combination of both hardware and software.

More specifically, communication management resource 145 can be configured to include communication management hardware, communication management software, or a combination of communication manager hardware and communication management software; sensor 175 can be configured to include sensor hardware, sensor software, or a combination of sensor hardware and sensor software; communication management resource 195 can be configured to include communication management hardware, communication management software, or a combination of communication manager hardware and communication management software; and so on.

Assume that the user 108 has not yet configured the corresponding communication device 110 to access the network 190. This disclosure includes the observation that conventional techniques of registration and providing a respective user and corresponding communication device access to a wireless network and configuration for such use can be improved.

For example, as previously discussed, conventional techniques require the user to provide a password and username to access services provided by the network 190. In contrast to conventional techniques, communication device 110 includes communication management resource 145. The communication management resource 145 controls sensor 175 (such as image sensor) to capture an image (biometric information such as a fingerprint or other body part) of the user 108. Via the received image 177, the communication management resource 145 produces biometric data 179. From the biometric data 179, the communication management resource 145 produces biometric information 199 (such as first instance of biometric data 199) including code vector #1, code vector #2, code vector #3, etc., and an evaluation key.

Figure 3:
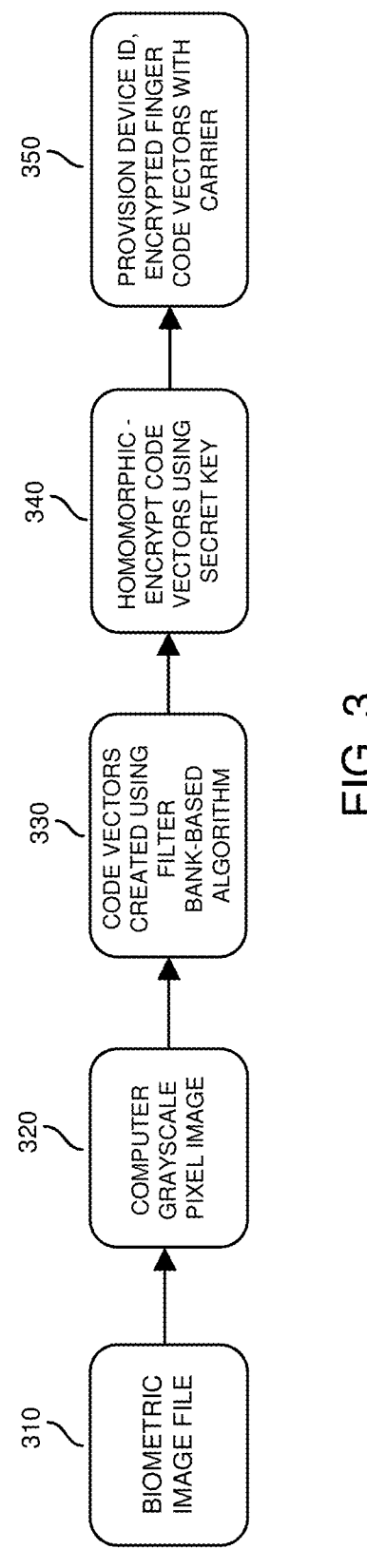
FIG. 3 is an example diagram illustrating creation of biometric information according to embodiments herein.

As further discussed herein, the communication management resource 145 can be configured to produce the biometric information 199 based on BOPS III or other suitable protocol as discussed in FIG. 3.

Referring again to FIG. 1, assume that the communication device 110 is not yet registered to use the wireless network 190. In furtherance of registering the communication device 110 to use network 190, the communication management resource 145 encrypts the biometric information 199 using encryption key 129 stored in subscriber information 131. For example, in one embodiment, the communication management resource 145 retrieves the encryption key 129 from a SIM (Subscriber Identity Module) or eSIM installed on the communication device 110. The communication management resource 145 applies the encryption key 129 to the biometric information 199. The encryption key 129 is a private encryption key assigned to the communication device 110 to support wireless communications in wireless network environment 100.

Thus, in one embodiment, the communication management hardware 145 generates a first instance of biometric information 199 derived from a user 108 operating the communication device 110. As previously discussed, to generate the encrypted biometric information 199-ENC1, the communication management hardware 145 retrieves the encryption key 129 assigned to the communication device 110. Via application of the encryption key 129 to the first instance of biometric information 199, the communication management hardware 145 produces first encrypted biometric information 199-ENC1.

In accordance with further example embodiments, the first encrypted biometric information 199-ENC1 includes encrypted code vectors (#1, #2, #3, etc.) derived from an image 177 (such as fingerprint, face, etc.) of the user 108.

As further shown, to register the communication device 110 with the network 190, the communication management hardware 145 communicates the first encrypted biometric information 199-ENC1 (such as including the encryption key 128) and an identity XXXY of the communication device 110 over a wireless network connection 127 from the communication device 110 to communication management resource 195 for subsequent use of the wireless network by the mobile communication device 110. As further discussed herein, the account registration portal 150 and billing/OSS (Operations Support System) 160 participate in registering the communication device 110 for subsequent use.

In one embodiment, as further discussed herein, in response to communicating the first encrypted biometric information and completing the registration process, the communication management hardware 145 of the communication device 110 receives a wireless configuration information profile 299 from the communication management resource 195. The communication management hardware 145 or other suitable entity then installs the wireless configuration information profile 299 onto the communication device 110.

In one embodiment, the wireless configuration information profile 299 is used by the communication management hardware 145 to manage subsequent connectivity of the (mobile) communication device 110 with the wireless network 190. For example, in one embodiment, in accordance with the configuration information profile 299, the communication management resource 145 generates a second instance of biometric information derived from the user operating the mobile communication device 110 and communicates such information to an authenticator to use the wireless network.

Yet further, as discussed herein in more detail below, in one embodiment, the communication management hardware 145 of the communication device 110 communicates the first encrypted biometric information 199-ENC1 including an evaluation key 128 and unique identifier value XXXY over a wireless communication link 127 to a remote authentication management resource (such as communication management resource 195) for subsequent authentication of the communication device 110 such that the mobile communication device is able to use a wireless network to which the encryption key 129, configuration information profile 299, and subscriber information 131 pertain.

Service Subscription

Thus, in one embodiment, prior to providing the communication device 110 wireless services, the user 108 creates a subscriber account with a device ID XXXY of the communication device 110 biometric information associated with the user 108.

For example, as discussed herein, the user 108 registers with a respective wireless carrier (i.e. wireless network service provider) and proceeds to create an account. The process of registration can be completed online through a service subscription portal (such as web page) or in provider's store through the billing system portal.

During registration, the user 108 selects the desired one or more services and provides information required to create the respective account. The information potentially includes information such as: the subscriber's name, address, credit card, phone number, phone ID (IMEI, EID or serial number), etc. To complete registration, the carrier system (wireless network service provider) associates the communication device 110 to the user's account, which requires device information.

In one embodiment, two types of information are received from the subscriber: one associated to the subscriber and the account of the subscriber, and the second is associated to the wireless device like device ID (could be IMEI, EID, hash of the device iSIM public key or serial number to identify the device).

The device ID XXXY (globally unique identifier value assigned to the communication device 110) is required by most Mobile standards to be compliant with eSIM/iSIM remote provisioning standards. In the case of Wi-Fi™, there is a very loose association between the respective communication device 110 and the user's account or service. Most of the time Wi-Fi™ networks require single user credentials to associate and do not authenticate the device itself.

As further discussed herein, inclusion of biometric identifier (such as unique encrypted biometric information 199-ENC1 to the device iSIM) in the account information of the subscriber, enables the wireless network service provider (such as operating communication management resource 195) to provide wireless services.

Embodiments herein introduce a unique device ID method that is used for identifying the subscriber (user 108) and the device 110 going forward for the purpose of providing one or more communication device services. In one embodiment, this is possible because the encrypted vectors (associated with the user's biometric information 199 such as fingerprint, facial image, etc.) as discussed herein are unique to the user 108 and the corresponding encryption key 129 (such as a private encryption key associated with the SIM information or subscriber information 131), which is a unique encryption key assigned to the communication device 110.

In further example embodiments, the public key used in the encryption of the code vectors or the evaluation key to produce encrypted biometric information 199-ENC1 of the communication device 110 can be used to identify a specific device.

Further embodiments herein potentially include an implementation in which the of a 256 bit hash of the private key, which is encoded using base32=52 character device ID value. This process creates a unique permanent device ID value. Via either method, the credentials are communicated in a tunnel and are never available to outside entities due to security reasons.

For Wi-Fi™ use today, some networks require the user 108 to provide a username such as an email address. This can be provisioned by Wi-Fi™ network as a username.

Note further that there are several possible methods for a subscriber to create an account such as through a sales portal in a store, website application, live registration through online signup, etc. As further discussed herein, embodiments herein include submitting secure biometric credentials during account creation.

Figure 2:
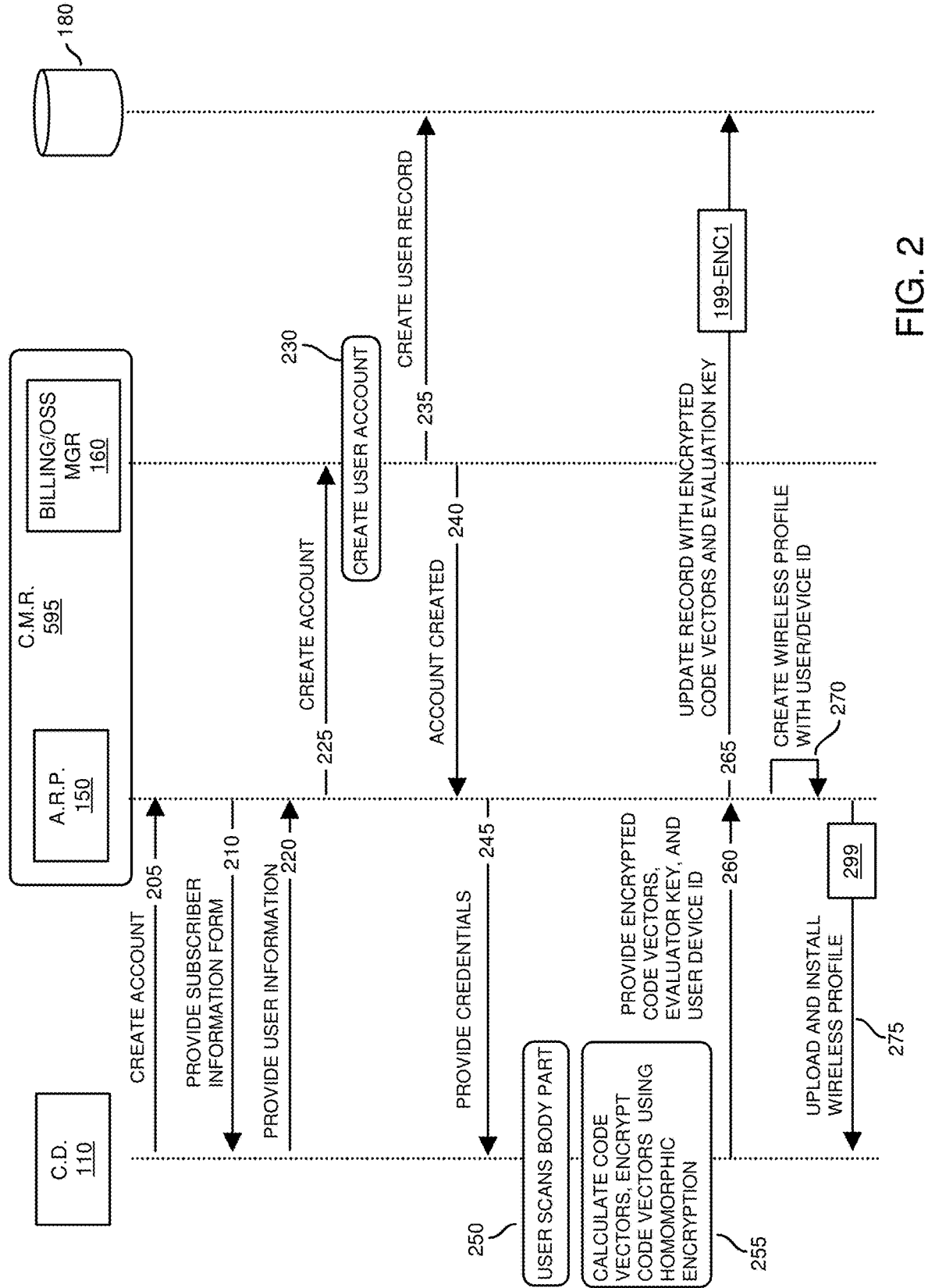
FIG. 2 is an example diagram illustrating details of registering a mobile communication device using encrypted biometric information according to embodiments.

FIG. 2 is an example diagram illustrating registration of a mobile communication device using encrypted biometric information according to embodiments.

Prior to use of the wireless network 190, the user 108 of the communication device 110 registers with the corresponding wireless network service provider via the following operations.

For example, via mobile communication device 110 or other suitable entity, the user 108 initiates creation of a respective account via communications 205 to the account registration portal 150 of the communication management resource 195.

Via communications 210, the account registration portal 150 presents the user 108 a registration form such as in the form of a web page on the display screen 130 of the communication device 110 for the user 108 to supply data.

Via communications 220, the user 108 provides user information such as name, address, account information, etc.

Via communications 225 from the account registration portal 150 to the billing manager 160, the account registration portal 150 initiates creation of a respective account associated with the user 108.

Via function 230, the billing/OSS manager 160 creates a respective user account associated with the user 108.

In one embodiment, via further communications 235, the billing/OSS manager 160 communicates information (such as including a unique identifier value XXXY) of the communication device 110 and corresponding user 108 to create the user account.

As further shown, the billing/OSS manager 160 notifies the account registration portal 150 of the newly created account via communications 240.

Via communications 245, the account registration portal 150 provides credentials 245 to the communication device 110. The credentials 245 (such as all or a portion of subscriber information 131 associated with eSIM device 122) enable the corresponding communication device to use wireless services provided by the network 190.

Via operation 250, the user 108 is prompted to provide an image scan. The user 108 operates the communication device 110 to scan a body part such as a finger as part of the registration process. In such an instance, as previously discussed, the sensor 175 produces a respective image 177 of a fingerprint of the corresponding user 108. The communication management resource 145 produces biometric data 179 from the image 177. The communication management resource 145 derives biometric information 199 from the respective biometric data 179. See example in FIG. 3.

Referring again to FIG. 2, via function 255 executed by an application (such as communication management resource 145) on the communication device 110, the communication device 110 calculates corresponding code vectors for biometric information 199 and encrypts the code vectors using homomorphic encryption using corresponding encryption key 129. The encrypting results in generation of the encrypted biometric information 199-ENC1.

Via communications 260, the communication device 110 provides encrypted biometric information 199-ENC1 including encrypted code vectors, a corresponding evaluator key, and user device ID to the account registration portal 150.

Via communications 265, the account registration portal 150 then updates records associated with the user 108 such as by storing the encrypted biometric information 199-ENC1 such as encrypted code vectors (derived from user 108 biometric information such as fingerprint) and corresponding evaluation key 128 in the repository 180.

During operation 270, the account registration portal 150 creates wireless profile 299 including user/device identifier information.

Via further communications 275, the account registration portal 150 communicates the created wireless profile 299 (such as wireless network name, certificate, wireless network service provider name, credentials, function that asks for subsequent fingerprint scan on connecting to the wireless network, etc.) associated with the user 108 and corresponding communication device 110 to the communication device 110. The communication management resource 145 of the communication device 110 installs or downloads the corresponding wireless profile 299 on to the communication device 110. This includes installing configuration information on the communication device 110 indicating to provide a respective fingerprint scan to access the respective wireless network (See FIGS. 6 and 7) during subsequent authentication. Thus, in one embodiment, the corresponding wireless profile 299 indicates a protocol to be implemented by the user 108 and/or communication device 110 to subsequently use the wireless network 190.

FIG. 3 is an example diagram illustrating creation of biometric information according to embodiments herein.

Embodiments herein include creating a biometric ID (identifier) based on any suitable method. In one nonlimiting example embodiment, the communication management resource 145 or other suitable entity produces multiple instances of biometric information based on an industry standard "Biometric Open Protocol Standard (BOPS III), IEEE 2410-2018" or other suitable protocol.

More specifically, in processing operation 310, in a similar manner as previously discussed, the communication management resource 145 captures an image (such as fingerprint, face, body part, etc.) associated with the user 108 and stores it as a biometric image 177.

In processing operation 320, the communication management resource 145 converts the biometric image 177 into biometric data 179 such as computer grayscale pixel image information.

In processing operation 330, the communication management resource 145 extracts and creates code vectors associated with the biometric image 177 or biometric data 179 to produce biometric information 199 using a filter bank-based algorithm.

In processing operation 340, the communication management resource 145 applies homomorphic encryption (such as via retrieved encryption key 129) to the code vectors of the biometric information 199 using the encryption key 129

(such as secret key of the communication device 110) to produce encrypted biometric information 199-ENC1. In one embodiment, the encryption key 129 also supports wireless communications between the communication device 110 and the wireless network 190.

In processing operation 350, the communication management resource 145 and corresponding communication device 110 transmit a username and/or device ID XXXY (such as assigned network address or other suitable information) along with the encrypted code vectors and an evaluation key (such as biometric information 199-ENC1) to the wireless service provider (carrier) system (such as communication management resource 195) during registration. As previously discussed, the code vectors in the encrypted biometric information 199-ENC1) are encrypted using homomorphic encryption.

Figure 4:
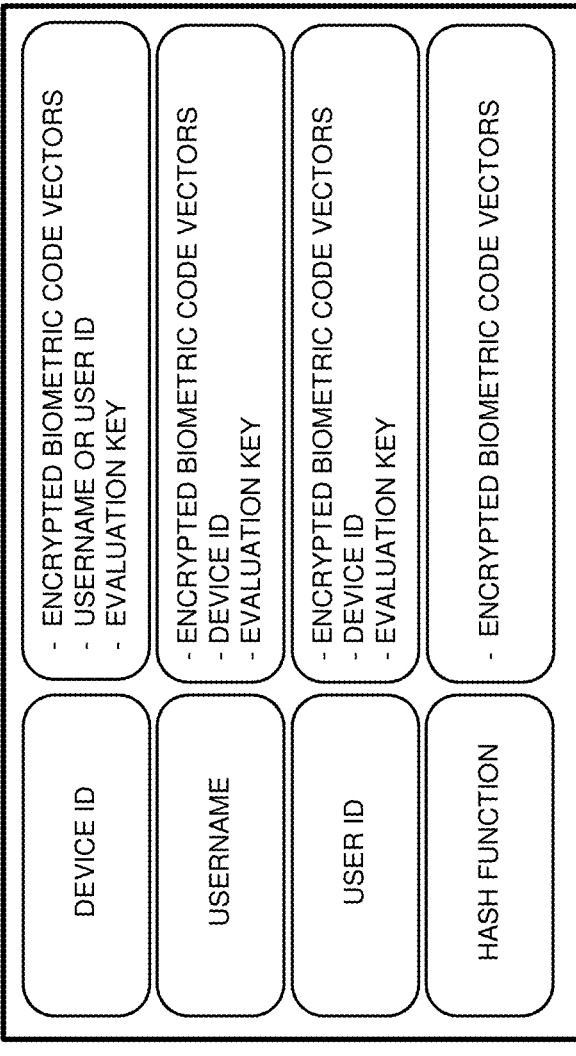
FIG. 4 is an example diagram illustrating subscriber record attributes according to embodiments herein.

FIG. 4 is an example diagram illustrating subscriber record attributes and storage of bio credentials according to embodiments herein.

In one embodiment, the carrier systems or servers (such as communication management resource 195, 595, etc.) as discussed herein store a record for each subscriber (such as user 108 and other communication device users) with their provisioned information such as:

The encrypted biometric code vectors

The user name or user ID

The device ID

The evaluation key

Other information can be added to a respective user record.

The carrier (wireless service provider) selects any of one or more of these attributes as a key to the record used in indexing and searching.

In further example embodiments, the lookup can be implemented on device ID, Username or the evaluation Key. Note further that it is possible for the system not to use the user identifier or device identifier but to depend only on the encrypted biometric code. In this case, the device will provide the SHA-256 hash of the device certificate as the supplicant ID The communication device 110 provides the 256 bit hash of the private key which encoded using base32=52 will provide a 52 character Key as the supplicant ID during the process of the authentication.

Figure 5:
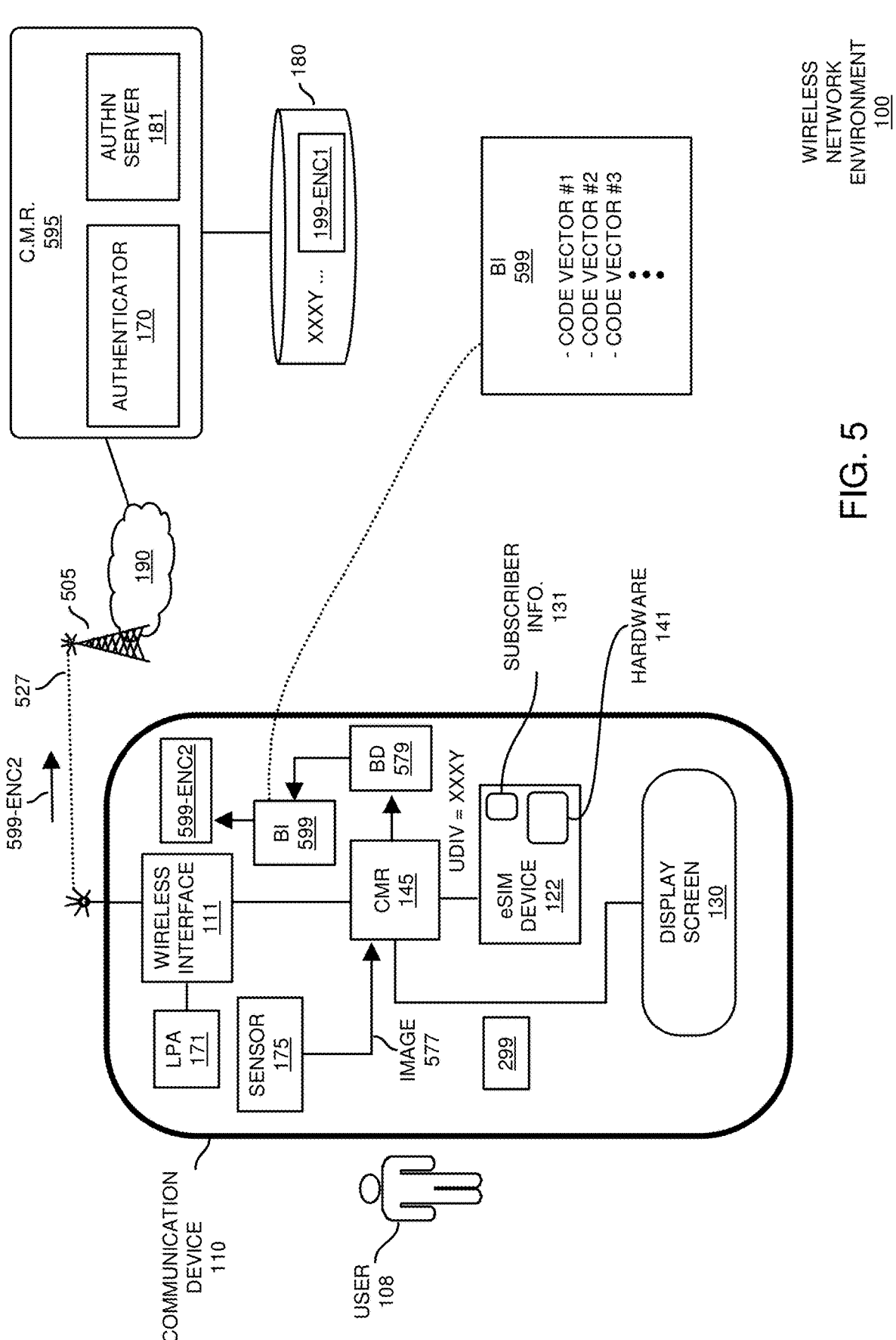
FIG. 5 is an example diagram illustrating communication device authentication and wireless network access based upon biometric information according to embodiments herein.

FIG. 5 is an example diagram illustrating wireless network access based upon biometric information according to embodiments herein.

As previously discussed, subsequent to registration, embodiments herein include authenticating the subscriber (user 108) via wireless and mobile networks.

3GPP 5G specification introduced a globally unique Subscription Permanent Identifier (SUPI) in specification TS 23.501. Specification TS 23.501 indicate that the Subscriber and network Identifier can be in the form of International Mobile Subscriber Identifier (IMSI) as defined in TS 23.503 or as a Network Access Identifier (NAI) with realm as defined in RFC 4282 and defined in TS 23.003. This enabled wireless 5G networks to break the dependency on IMSI and expand the capability of using other identifiers particularly highly secured Biometric identifiers.

For Wi-Fi services, embodiments herein can include use of biometric ID in conjunction with user or device identifier for EAP (Extensible Authentication Protocol) authentication for example in EAP-TLS (Transport Layer Security) and EAP Expanded method. In such an instance, the EAP expanded method (Expanded Type is used for functions specific only to one vendor's implementation of EAP) is a vendor-specific EAP method that allow the carrier to communicate the encrypted code vectors over an established TLS tunnel.

As further discussed below, embodiments herein include the user 108 requesting use of the wireless network 190. In response to input from the user 108 attempting to establish connectivity with the wireless base station 505 of the wireless network 190, the communication management resource 145 prompts the user 108 to provide biometric data such as a fingerprint scan in accordance with the configuration settings 299.

The sensor 175 of the communication device 110 scans the fingerprint of the user 108 and produces the image 577. The communication management resource 145 converts the image 577 into biometric data 579 (similar to the process above used to register the user 108 with the wireless network service provider). For example, via the received image 577, the communication management resource 145 produces biometric data 579. From the biometric data 579, the communication management resource 145 produces biometric information 599 (such as second instance of biometric data) including code vector #1, code vector #2, code vector #3, etc. As further discussed herein, in a similar manner as previously discussed, the communication management resource 145 can be configured to produce the biometric information 599 from the image 577 and biometric data 579 based on BOPS III or other suitable protocol as discussed in FIG. 3.

Referring again to FIG. 5, in furtherance of authenticating the communication device 110 to use the wireless service (such as support a phone call to a remote communication device in wireless network environment 100, establish a data connect to access the Internet, etc.) requested by the user 108, the communication management resource 145 encrypts the biometric information 599 using encryption key 129 stored in subscriber information 131.

For example, in one embodiment, the communication management resource 145 retrieves the encryption key 129 from subscriber information 131 such as a SIM (Subscriber Identity Module) or eSIM installed on the communication device 110. The encryption key 129 is a private encryption key assigned to the communication device 110 to support wireless communications in wireless network environment 100. The communication management resource 145 applies the encryption key 129 to the biometric information 599 to produce the encrypted biometric information 599-ENC2.

Thus, in one embodiment, the communication management hardware 145 generates a second instance of biometric information 599 derived from a user 108 operating the communication device 110. In accordance with further example embodiments, the first encrypted biometric information 599-ENC2 includes encrypted code vectors (#1, #2, #3, etc.) derived from an image 577 (such as fingerprint, face, etc.) and biometric data 579 associated with the user 108.

In furtherance of authenticating the mobile communication device 108 and corresponding user 110 to use the network 190, the communication management hardware 145 communicates the second encrypted biometric information 599-ENC2 and an identity XXXY of the communication device 110 over a wireless network connection 527 from the communication device 110 to communication management resource 595. As discussed in more detail below, the account authenticator 170 and authentication server 181 operate to authenticate the communication device 110 and corresponding user prior to providing a respective requested wireless service.

By way of non-limiting example embodiment, authentication includes a comparison of the newly provided encrypted biometric information 599-ENC2 to the encrypted biometric information 199-ENC1 supplied during registration. If the encrypted biometric information 599-ENC2 substantially matches the encrypted biometric information 199-ENC1 stored in repository 180, the communication management resource 595 provides notification that the communication device 110 and user 108 are authenticated to use the wireless network 190. Additional details of authentication are discussed below.

Figure 6:
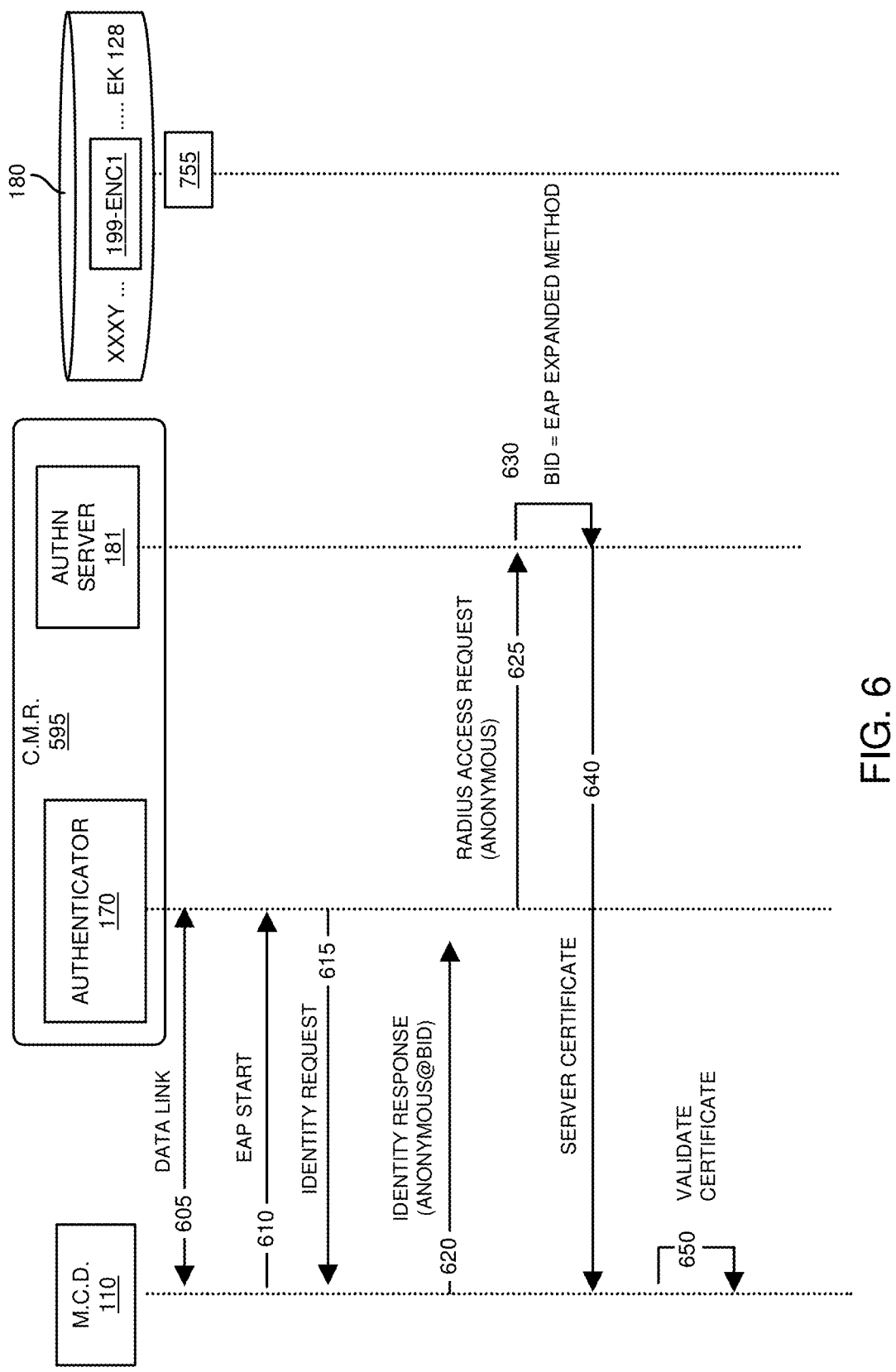
FIGS. 6 and 7 are example diagrams illustrating authentication of a mobile communication device to use a respective wireless network according to embodiments herein.
Figure 7:
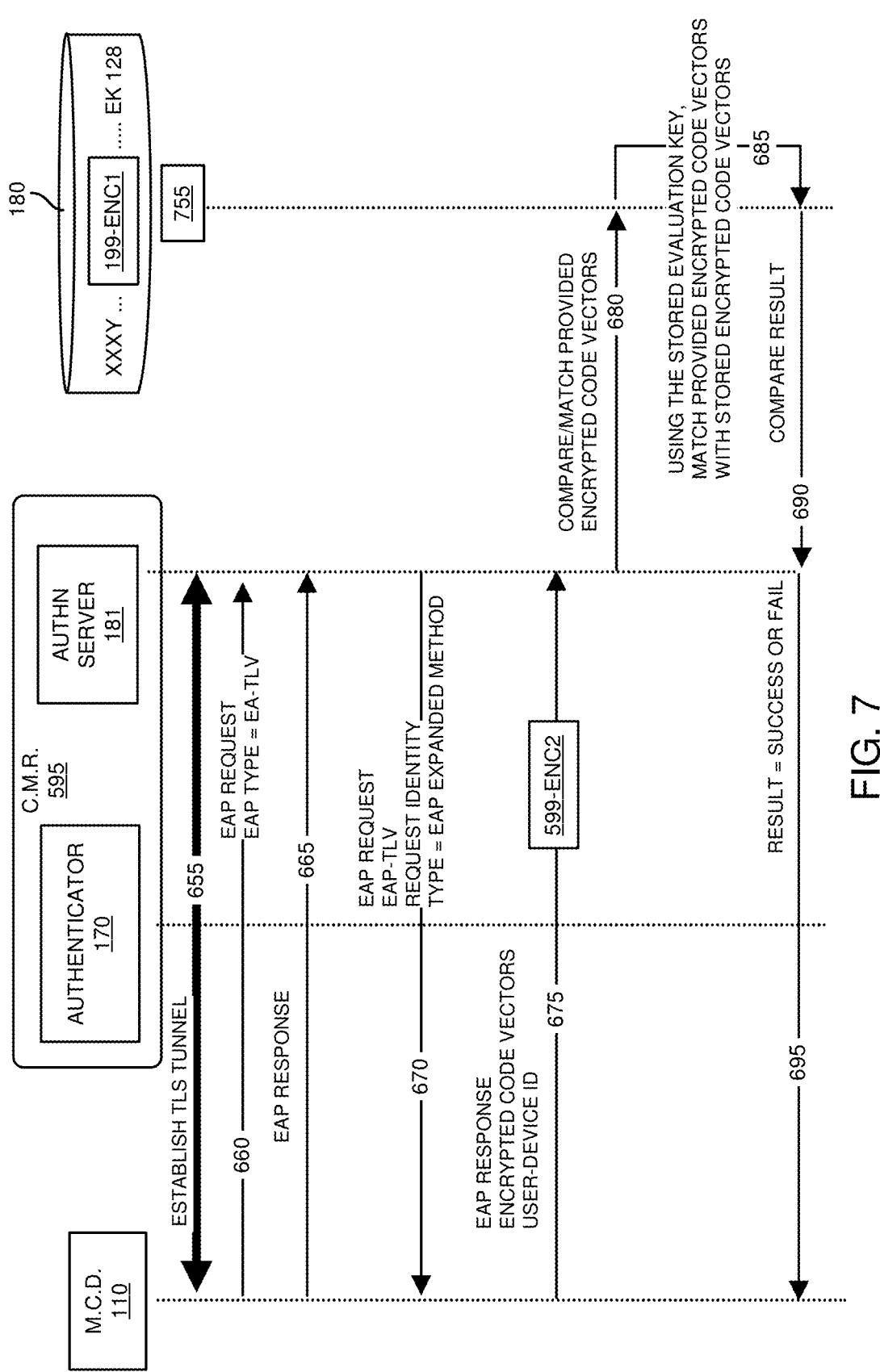

FIGS. 6 and 7 are example diagrams illustrating authentication of a mobile communication device according to embodiments herein.

More specifically, FIG. 6 describes creating a tunnel according to embodiments herein. FIG. 7 describes how to use biometric vectors in EAP authentication according to embodiments herein. Embodiments herein include implementation of novel processing of biometric vectors during EAP authentication.

When the communication device 110 finds the network 190, the device 110 implements the following authentication process:

Via communications 605, the mobile communication device 110 establishes a respective communication link 527 with the communication management resource 595. In one embodiment, the communication device 110 establishes a respective data link (wireless communication link) in accordance with wireless communication protocol such as 802.11, Wi-Fi™, cellular, 5G, private wireless network, etc., or other suitable wireless and/or authentication communication protocols.

Via communication 610, the communication device 110 starts EAP-TLS authentication with the authenticator 170.

Via communication 615, the authenticator 170 requests the mobile communication device 110 to provide its identity to the authenticator 170.

Via communication 620, the communication device 110 provides an identity of the communication device 110 for the outer authentication; in one embodiment, the identity is obtained from the configuration settings 299 previously provisioned to the communication device 110 during registration as previously discussed.

Via communications 625, the authenticator 170 communicates the identity of the communication device 110 to the authentication server 181.

Via function 630, the authentication server 181 checks if there is a realm for policy (including roaming). The authentication server 181 finds the specific realm associated with the policy for biometric authentication. Based on the realm, the server 181 implements a policy (EAP expanded method) for biometric authentication of the mobile communication device 110.

Via communications 640, the authentication server 181 communicates its certificate to the communication management resource 145 of the mobile communication device 110.

Via function 650 executed by the communication management resource 145 of the mobile communication device 110, the function 650 validates a name of the received certificate based on a comparison of the name of the received certificate to the name stored in the wireless profile information 299. If the name of the received certificate matches the name of the certificate stored in the wireless profile information 299, the communication management resource 145 continues with authentication. Otherwise, the communication device 110 terminates the authentication.

As further shown in FIG. 7, after successful validation of the server certificate name provided by the authentication server 181 via prior communications 640, the communication device 110 and authentication server 181 establish a TLS tunnel as indicated by communications 655. Note that subsequent communications between the communication device 110 and authentication server 181 occur over the established TLS tunnel, in which all subsequent transmitted communications (such as communications 660, 665, 670, 675, 695) are encrypted.

Via communication 660 over the EAP tunnel, the authentication server 181 starts the EAP Expanded method authentication by requesting an identity of the communication device 110.

Via communications 665, the communication device 110 acknowledges and responds to the request by providing an EAP-Payload-TLV identity of the communication device 110 to the authentication server 181.

Via communication 670, the authentication server 181 requests an expanded type authentication identity from the communication device 110.

Via communications 675, the communication device 110 provides the encrypted biometric information 599-ENC2 and its unique device identifier value XXXY to the authentication server 181.

During operation 680, the authentication server 181 receives the encrypted biometric information 599-ENC2 including encrypted code vectors. Further, during operation 680, the authentication server 181 forwards the encrypted code vectors retrieved from the encrypted biometric information 599-ENC2 and unique identifier value XXXY to subscriber data base (repository 180). In one embodiment, the communications 680 to the repository 180 include a request to determine if the forwarded encrypted code vectors associated with the encrypted biometric information 599-ENC2 substantially match the code vectors in encrypted biometric information 199-ENC1 stored in the repository 180.

During operation 685, the subscriber database function 755 (such as including repository 180) obtains the code vectors (encrypted biometric information 199-ENC1) associated with the mobile communication device 110 by mapping the received unique identifier value XXXY to the previously stored biometric credentials including encrypted biometric information 199-ENC1. In one embodiment, the subscriber database function 755 produces a respective encrypted evaluation status (i.e., comparison evaluation information) indicating a degree to which the received code vectors from encrypted biometric information 599-ENC2 match the code vectors associated with the previously stored encrypted biometric information 199-ENC1. The subscriber database function 755 further uses the evaluation key 128 to decrypt the encrypted evaluation status to produce compare results indicating whether or not there is an appropriate match between the code vectors in the encrypted biometric information 599-ENC2 and the encrypted code vectors in the encrypted biometric information 199-ENC1.

Via communications 690, the subscriber database function 755 sends the result of the comparison (compare result such as match or no match) to the authentication server 181.

Via communications 695, the authentication server 181 notifies the mobile communication device 110 whether the authentication is a success (sufficient match of the encrypted biometric information 599-ENC2 to the encrypted biometric information 199-ENC1) or failure (insufficient match of the encrypted biometric information 599-ENC2 to the encrypted biometric information 199-ENC1).

Thus, embodiments herein include, via the subscriber database function 755: i) performing a comparison of the first encrypted biometric information 199-ENC1 and the second encrypted biometric information 599-ENC2; ii) producing comparison evaluation information (compare results) based on the comparison; and iii) applying an evaluation key 128 to the comparison evaluation information to retrieve evaluation results of comparing the first encrypted biometric information and the second encrypted biometric information. Based on the evaluation results, the subscriber database function 755 produces a notification (compare results in the communications 690) indicating a decision to grant or not grant the communication device 110 use of the wireless network 190 and communicates the notification to the communication device 110.

Note further that the processes as discussed herein can operate in accordance with any suitable wireless communication protocol such as Wi-Fi™™, cellular such as LTE (Long Term Evolution), etc.

In one embodiment, the communication devices (such as including the communication device 110) are provisioned with a Passpoint or 802.1x Wi-Fi Profile for a specific Wi-Fi network, and utilize this authentication method by incorporating the encrypted code vectors in the credentials.

In further example embodiments, as previously discussed, the profile information 299 includes a function causing the communication device 110 to request biometric data like the fingerprint based on the Wi-Fi™ profile the device searches for the network ID or name to connect with. In further example embodiments, the password is 640 bytes, which exceeds the standard of 253 bytes indicated by RFC 7542

After receiving the device ID such as value XXXY associated with the encrypted finger code vector attributes, the authenticator 170 uses an internal API (Application Programming Interface) to pass these attributes to an verification function (such as image verification function 855 in FIG. 8) to the subscriber database system (such as including repository 180) storing the user credentials or database.

Note that the verification function 855 can be configured to use any of the advanced verification methods to match the finger code provided by the supplicant with the stored encrypted finger code. In one embodiment, this is achieved with an access to an evaluation key, the server can still compute the square of Euclidean distance between two encrypted Finger Code vectors. In further example embodiments, as previously discussed, the authentication server or other suitable entity compares the result with the encrypted threshold to determine if it is within a threshold value. If the encrypted biometric information 599-ENC2 provides a match to the encrypted biometric information 199-ENC1 above a threshold value, the verification function returns a success notification of "match" and the communication device 110 is provided wireless network services via the wireless network 190 such as to access/use the Internet, cellular phone system, etc. Conversely, if the encrypted biometric information 599-ENC2 does not match with the encrypted biometric information 199-ENC1 above a threshold value, the verification function returns a fail notification of "no match" and the communication device 110 and corresponding user 108 are denied use of the wireless network 190.

Figure 8:
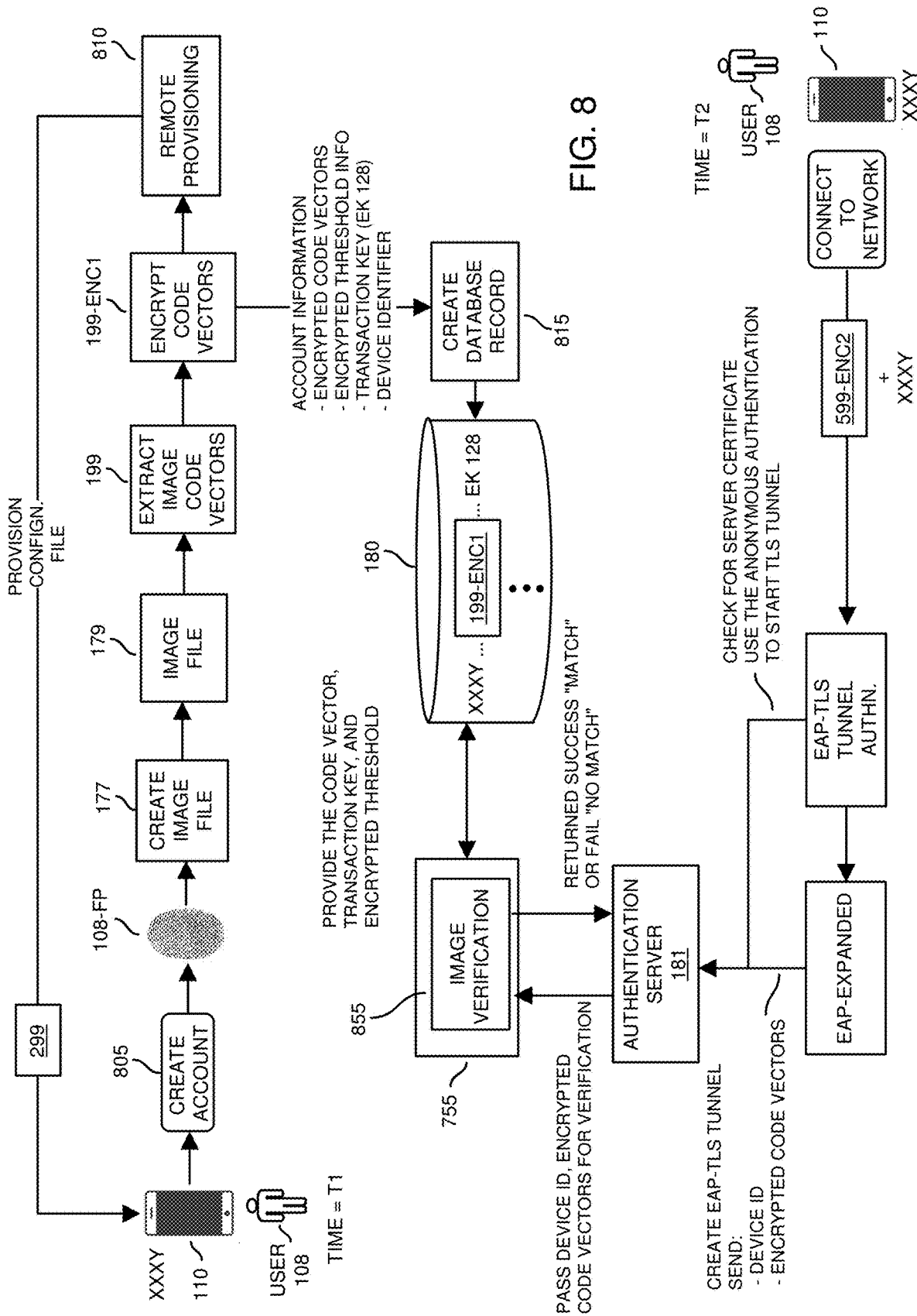
FIG. 8 is an example diagram illustrating creation and matching of code vectors in furtherance of providing wireless access according to embodiments herein.

FIG. 8 is an example diagram illustrating creation and matching of code vectors in furtherance of authenticating a respective communication device and providing wireless access according to embodiments herein.

As previously discussed, and as further shown in this example flow diagram, the user 108 creates an account (operation 805) with the service provider at time T1 (e.g., registration). This includes providing a biometric image 177 of a body part 108-FP associated with the user 108. The communication management resource 145 produces the biometric data 179 from the image 177. The communication management resource 145 derives/extracts image code vectors from the biometric data 179 to produce the biometric information 199. Via application of the respective encryption key 129 assigned to the communication device 110 to the biometric information 199, the communication management resource 149 produces the encrypted biometric information 199-ENC1 (such as including encrypted code vectors, encrypted threshold information, transaction key information, device identifier XXXY, etc.). In a manner as previously discussed, via operation 815, the communication management resource 195 stores the unique identifier value XXXY, encrypted biometric information 100-ENC1, and encryption evaluation key 128 in the repository 180. Additionally, the communication management resource 195 produces a respective configuration file 299 and communicates same to the communication device 110 for downloading/installation as part of the registration process.

Additionally, as previously discussed, and as further shown in this example flow diagram, the user 108 attempts to use wireless network 190 at or around time T2 subsequent to registration. In such an instance, the communication device 110 connects to the wireless network 190 and, in accordance with the configuration setting information 299, produces the encrypted biometric information 599-ENC2. In a manner as previously discussed in prior FIGS., this includes providing a biometric image of a body part 108-FP associated with the user 108. The communication management resource 145 of communication device 110 produces the biometric data 579 from the image 577. The communication management resource 145 derives/extracts image code vectors from the biometric data 579 to produce the biometric information 599. Via application of the respective encryption key 129 assigned to the communication device 110, the communication management resource 145 produces the encrypted biometric information 599-ENC2 (such as including encrypted code vectors).

In order to connect to the wireless network 190, and perform authentication, the communication device 110 establishes a respective TLS tunnel with the authentication server 181. The communication device 110 forwards the encrypted biometric information 599-ENC2 over the tunnel to the authentication server 181. In a similar manner as previously discussed, the authentication server 181 communicates the encrypted biometric information 599-ENC2 to the subscriber database function 755. The subscriber database function 755 implements image verification function 855, which compares the received encrypted biometric information 599-ENC2 to the encrypted biometric information 199-ENC1 stored in repository 180. As previously discussed, the subscriber database function 755 produces an authentication result indicating that the communication device 110 is entitled to use of the wireless network 190 if the code vectors in the received encrypted biometric information 599-ENC2 match the encrypted biometric information 199-ENC1 in repository above a threshold value as indicated by the encrypted threshold information produced during the account creation.

Embodiments herein are useful over conventional techniques. For example, via advanced biometric sensing technology as discussed herein, mobile devices are able to capture biometric information and convert such information into secure and private user credentials and identification.

With the introduction of iSIM as a hardware security module (HSM), embodiments herein encrypt biometric data with locally generated private encryption keys (such as associated with a SIM) assigned to the communication device 110 and/or user 108, root of trust, and create public transaction keys.

The benefit to the wireless network service provider, embodiments herein include a simple provisioning method in which the device seamlessly provides all information and the subscriber only provides a finger swipe (such as fingerprint image of finger of the user or other body part).

Because the credentials used to access the wireless network are associated with the user's biometric identification, in the event that another user is using the device, the device ID will still be the same, but the fingerprint will not match corresponding data stored by the wireless network service provider, and the authentication of the non-user will fail. This prevents a person that steals the communication device 110 from using the communication device 110 to call another party via the wireless network.

The biometric credentials as discussed herein are private, securely encrypted credentials that are resilient to loss, theft, exposure, and hacking.

This authentication method as discussed herein can be configured to identify and link the communication device 110 to a single user or owner.

The enhanced device management as discussed herein allows a device upgrade and swapping while mitigating device tampering. The user can obtain an upgrade by updating the device information and fingerprint online through a carrier portal.

Embodiments herein further benefit the subscriber by providing privacy and security with regard to credentials, network access, and device management. The subscriber will experience ease of network provisioning, access and credentials management.

Embodiments herein allow the carrier to accurately identify the devices, users and implement service policies.

Figure 9:
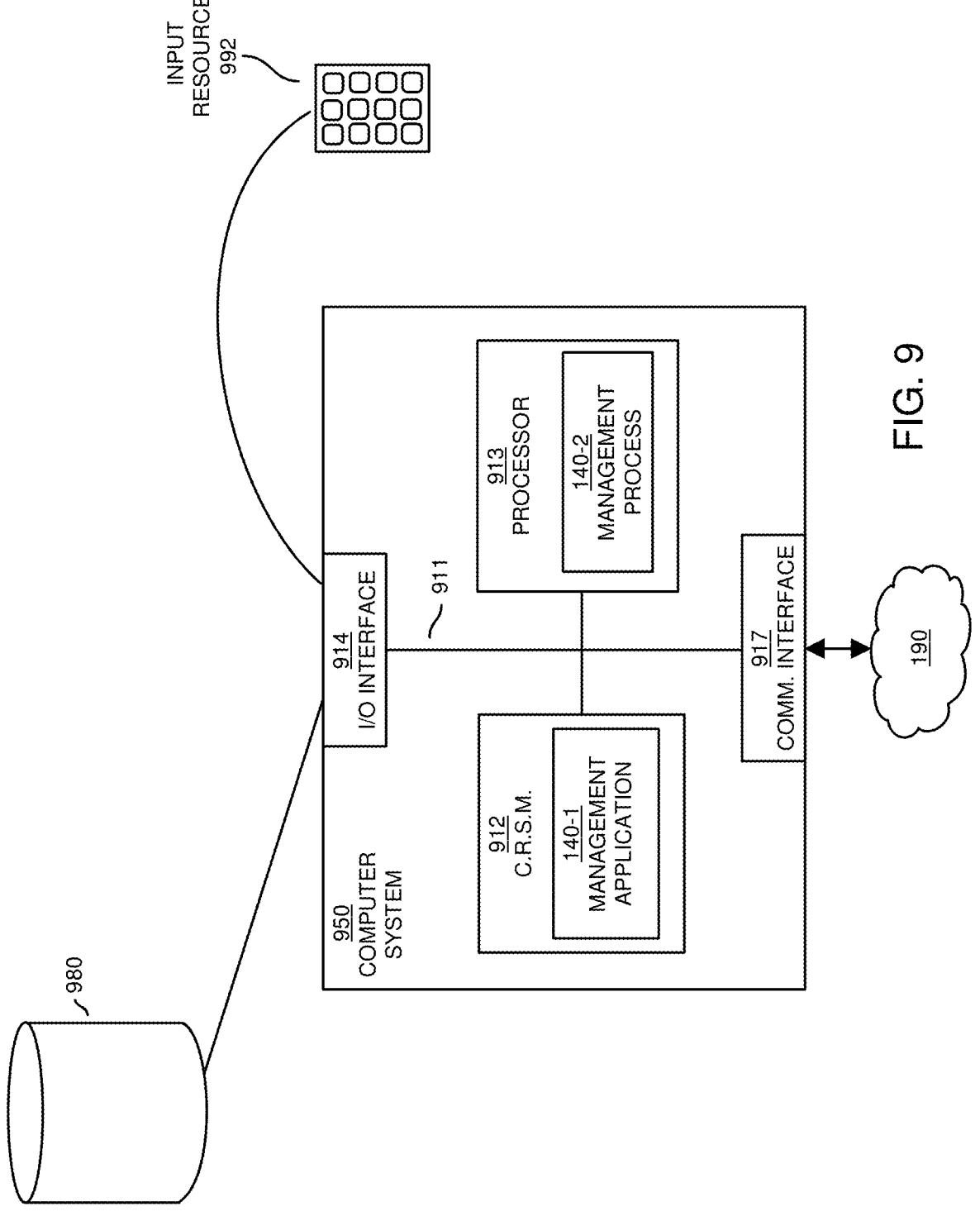
FIG. 9 is an example diagram illustrating example computer architecture operable to execute one or more operations according to embodiments herein.

FIG. 9 is an example block diagram of a computer system for implementing any of the operations as previously discussed according to embodiments herein.

Any of the resources (such as each of one or more wireless communication devices, gateway resources, network server, application servers 160, communication management resource 140, etc.) as discussed herein can be configured to include computer processor hardware and/or corresponding executable (software) instructions to carry out the different operations as discussed herein.

As shown, computer system 950 of the present example includes an interconnect 911 coupling computer readable storage media 912 such as a non-transitory type of media (which can be any suitable type of hardware storage medium in which digital information can be stored and retrieved), a processor 913 (computer processor hardware), I/O interface 914, and a communications interface 917.

I/O interface(s) 914 supports connectivity to repository 980 and input resource 992.

Computer readable storage medium 912 (such as computer-readable storage hardware) can be any hardware storage device such as memory, optical storage, hard drive, floppy disk, etc. In one embodiment, the computer readable storage medium 912 stores instructions and/or data.

As shown, computer readable storage media 912 can be encoded with management application 140-1 (e.g., including instructions) to carry out any of the operations as discussed herein.

During operation of one embodiment, processor 913 accesses computer readable storage media 912 via the use of interconnect 911 in order to launch, run, execute, interpret or otherwise perform the instructions in in the management application 140-1 stored on computer readable storage medium 912. Execution of the management application 140-1 produces management process 140-2 to carry out any of the operations and/or processes as discussed herein.

Those skilled in the art will understand that the computer system 950 can include other processes and/or software and hardware components, such as an operating system that controls allocation and use of hardware resources to execute management application 140-1.

In accordance with different embodiments, note that computer system may reside in any of various types of devices, including, but not limited to, a mobile computer, wireless communication device, gateway resource, communication management resource, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowchart in FIGS. 10 and 11. Note that the steps in the flowcharts below can be executed in any suitable order.

Figure 10:
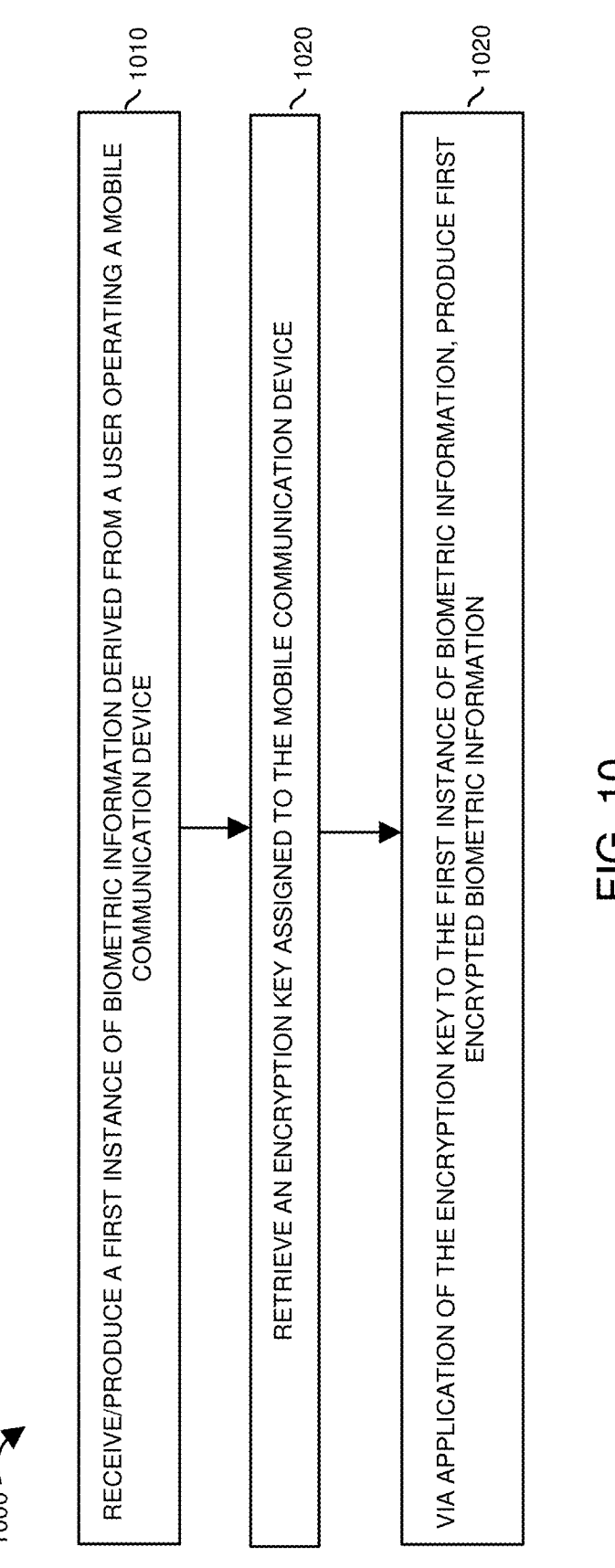
FIG. 10 is an example diagram illustrating a method according to embodiments herein.

FIG. 10 is a flowchart 1000 illustrating an example method according to embodiments herein. Note that there will be some overlap with respect to concepts as discussed above.

In processing operation 1010, the communication manager 145 of the mobile communication device 110 derives a first instance of biometric information from a user 108 operating the mobile communication device 110.

In processing operation 1020, the communication management resource 145 retrieves an encryption key assigned to the mobile communication device 110.

In processing operation 1030, via application of the encryption key 129 to the first instance of biometric information 198, the communication management resource 145 produces first encrypted biometric information 199-ENC1.

Figure 11:
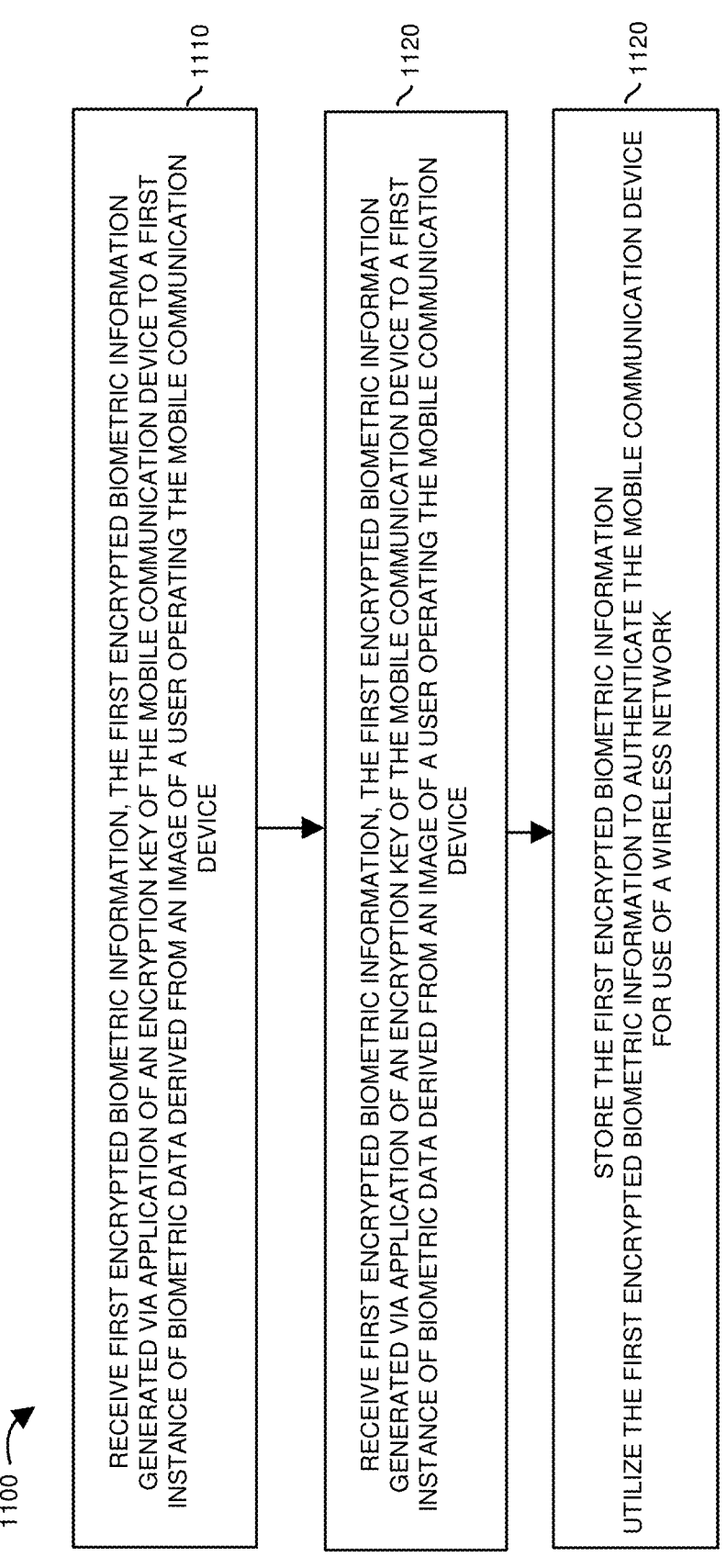
FIG. 11 is an example diagram illustrating a method according to embodiments herein.

FIG. 11 is a flowchart 1100 illustrating an example method according to embodiments herein. Note that there will be some overlap with respect to concepts as discussed above.

In processing operation 1110, the communication manager 195 receives first encrypted biometric information 199. In one embodiment, the first encrypted biometric information 199-ENC1 is generated via application of an encryption key 129 of the mobile communication device 110 to a first instance of biometric data 198 derived from an image 197 associated with a user 108 operating the mobile communication device 110.

In processing operation 1120, the communication management resource 195 stores the first encrypted biometric information 199-ENC2.

In processing operation 1130, the communication management resource 195 utilizes the first encrypted biometric information 199-ENC2 to authenticate the mobile communication device 110 for use of a wireless network 190.

Note again that techniques herein are well suited to facilitate authentication of mobile communication devices in a wireless network environment over multiple different networks. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. A method comprising:
deriving a first instance of biometric information from a user operating a mobile communication device;
retrieving an encryption key assigned to the mobile communication device;

via application of the encryption key to the first instance of biometric information, producing first encrypted biometric information; and
wirelessly communicating the first encrypted biometric information and an identity of the mobile communication device over a wireless network to an authentication resource that stores the first encrypted biometric information for subsequent authentication of the mobile communication device;
wherein the first encrypted biometric information includes encrypted code vectors derived from a first image of the user, the method further comprising:
in response to wirelessly communicating the first encrypted biometric information to the authentication resource, receiving a wireless configuration information profile assigned to the mobile communication device; and
installing the wireless configuration information profile onto the mobile communication device, the wireless configuration information profile managing subsequent connectivity of the mobile communication device with the wireless network via submission of a second instance of biometric information derived from the user operating the mobile communication device.

2. The method as in claim 1 further comprising:
wirelessly communicating an evaluation key over the wireless network to the authentication resource, the evaluation key supporting the subsequent authentication of the mobile communication device to use the wireless network to which the encryption key pertains.

3. The method as in claim 1 further comprising:
retrieving the encryption key from a SIM (Subscriber Identity Module) installed on the mobile communication device.

4. The method as in claim 1 further comprising:
subsequent to wirelessly communicating the first encrypted biometric information and the identity of the mobile communication device over the wireless network:
receiving a second instance of biometric information derived from the user operating the mobile communication device;
retrieving the encryption key assigned to the mobile communication device; and
via application of the encryption key to the second instance of biometric information, producing second encrypted biometric information.

5. The method as in claim 4 further comprising:
wirelessly communicating the second encrypted biometric information from the mobile communication device over the wireless network to the authentication resource.

6. The method as in claim 1, wherein the first instance of the biometric information is derived from processing an image of a body part of the user operating the mobile communication device.

7. The method as in claim 1 further comprising:
subsequent to wirelessly communicating the first encrypted biometric information and the identity of the mobile communication device over the wireless network:
in response to receiving input from the user operating the mobile communication device to access the wireless network, establishing wireless connectivity between the mobile communication device and the wireless network;

receiving a request for authentication information; and prompting the user of the mobile communication device to provide a biometric image of the user to access the wireless network.

8. The method as in claim 1 further comprising:

subsequent to receiving the wireless configuration information profile, transmitting a request from the mobile communication device to the authentication resource to use the wireless network; and receiving a communication from the authentication resource over the wireless network, the communication including identity information associated with the wireless configuration information profile.

9. The method as in claim 8 further comprising:

via a communication management resource at the mobile communication device, comparing the identity information received in the communication to identifier information stored in the wireless configuration information profile.

10. The method as in claim 9 further comprising:

in response to detecting that the identifier information stored in the wireless configuration information profile matches the identity information received in the communication from the authentication resource, transmitting a message from the mobile communication device over the wireless network to the authentication resource to authenticate the mobile communication device for the subsequent use of the wireless network.

11. The method as in claim 5 further comprising:

receiving an approval notification from the authentication resource over the network, the approval notification indicating that the mobile communication device is approved to use the wireless network, the authentication resource generating the approval notification in response to detecting that the second instance of biometric information associated with the second associated with the second encrypted biometric information matches the first instance of biometric information associated with the first encrypted biometric information above a threshold level.

12. The method as in claim 5 further comprising:

receiving a rejection notification from the authentication resource over the network, the rejection notification indicating that the mobile communication device is not approved to use the wireless network, the authentication resource generating the rejection notification in response to detecting that the second instance of biometric information associated with the second encrypted biometric information does not match the first instance of biometric information associated with the first encrypted biometric information above a threshold level.

13. The method as in claim 1 further comprising:

wirelessly communicating an evaluation key over the wireless network to the authentication resource, the evaluation key supporting the subsequent authentication of the mobile communication device to use the wireless network.

14. The method as in claim 13 further comprising:

via application of the encryption key to the second instance of biometric information derived from the second image of the user, producing a second instance of the encrypted biometric information; and wirelessly communicating the second instance of the encrypted biometric information and the identity of the mobile communication device over the wireless network to the authentication resource.

15. The method as in claim 1 further comprising:

retrieving an evaluation key installed on the mobile communication device; and wirelessly communicating the evaluation key from the mobile communication device over the wireless network to the authentication resource, the evaluation key supporting the subsequent authentication of the mobile communication device with the authentication resource to use the wireless network.

16. A system comprising:

communication management hardware operative to:

derive a first instance of biometric information from a user operating a mobile communication device;

retrieve an encryption key assigned to the mobile communication device;

via application of the encryption key to the first instance of biometric information, produce first encrypted biometric information; and wirelessly communicate the first encrypted biometric information and an identity of the mobile communication device over a wireless network to an authentication resource that stores the first encrypted biometric information for subsequent authentication of the mobile communication device;

wherein the first encrypted biometric information includes encrypted code vectors derived from a first image of the user, the communication management hardware further operative to:

in response to wirelessly communicating the first encrypted biometric information to the authentication resource, receive a wireless configuration information profile assigned to the mobile communication device; and install the wireless configuration information profile onto the mobile communication device, the wireless configuration information profile managing subsequent connectivity of the mobile communication device with the wireless network via submission of a second instance of biometric information derived from the user operating the mobile communication device.

17. The system as in claim 16, wherein the communication management hardware is further operative to:

wirelessly communicate an evaluation key to the authentication resource, the evaluation key supporting the subsequent authentication of the mobile communication device to use the wireless network to which the encryption key pertains.

18. The system as in claim 16, wherein the communication management hardware is further operative to:

subsequent to wirelessly communicating the first encrypted biometric information and the identity of the mobile communication device over the wireless network:

receive a second instance of biometric information derived from the user operating the mobile communication device;

retrieve the encryption key assigned to the mobile communication device; and via application of the encryption key to the second instance of biometric information, produce second encrypted biometric information.

19. The system as in claim 16, wherein the communication management hardware is further operative to:

subsequent to wirelessly communicating the first encrypted biometric information and the identity of the mobile communication device over the wireless network:

in response to receiving input from the user operating the mobile communication device to access the wireless network, establish wireless connectivity between the mobile communication device and the wireless network;

receive a request for authentication information; and prompt the user of the mobile communication device to provide a biometric image of the user to access the wireless network.

20. A non-transitory computer-readable storage hardware having instructions stored thereon, the instructions, when carried out by computer processor hardware, cause the computer processor hardware to:

derive a first instance of biometric information from a user operating a mobile communication device;

retrieve an encryption key assigned to the mobile communication device;

via application of the encryption key to the first instance of biometric information, produce first encrypted biometric information; and wirelessly communicate the first encrypted biometric information and an identity of the mobile communication device over a wireless network to an authentication resource that stores the first encrypted biometric information for subsequent authentication of the mobile communication device;

wherein the first encrypted biometric information includes encrypted code vectors derived from a first image of the user, the computer processor hardware further operative to:

in response to wirelessly communicating the first encrypted biometric information to the authentication resource, receive a wireless configuration information profile assigned to the mobile communication device; and install the wireless configuration information profile onto the mobile communication device, the wireless configuration information profile managing subsequent connectivity of the mobile communication device with the wireless network via submission of a second instance of biometric information derived from the user operating the mobile communication device.

21. A method comprising:

deriving a first instance of biometric information from a user operating a mobile communication device;

retrieving an encryption key assigned to the mobile communication device;

via application of the encryption key to the first instance of biometric information, producing first encrypted biometric information;

wirelessly communicating the first encrypted biometric information and an identity of the mobile communication device over a wireless network to an authentication resource that stores the first encrypted biometric information for subsequent authentication of the mobile communication device;

retrieving an evaluation key installed on the mobile communication device;

wirelessly communicating the evaluation key from the mobile communication device over the wireless network to the authentication resource, the evaluation key supporting the subsequent authentication of the mobile communication device with the authentication resource to use the wireless network;

wherein the first instance of the biometric information is generated based on a first image of the user, the method further comprising:

during the subsequent authentication of the mobile communication device, communicating a second instance of biometric information to the authentication resource, the second instance of biometric information derived from a second image of the user; and wherein the evaluation key is configured to decrypt evaluation information including evaluation results associated with comparison of the second instance of the biometric data to the first instance of the biometric data, the evaluation results indicating a status of the comparison.

22. The method as in claim 21 further comprising:

at the mobile communication device, receiving the evaluation results from the authentication resource during the subsequent authentication.

* * * * *